US010560708B2

(12) United States Patent
Hugosson et al.

(10) Patent No.: US 10,560,708 B2
(45) Date of Patent: Feb. 11, 2020

(54) SELECTING ENCODING OPTIONS TO USE WHEN ENCODING AN ARRAY OF DATA ELEMENTS

(71) Applicant: Arm Limited, Cambridge (GB)

(72) Inventors: Sven Ola Johannes Hugosson, Lund (SE); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 21 days.

(21) Appl. No.: 15/714,060

(22) Filed: Sep. 25, 2017

(65) Prior Publication Data
US 2018/0098078 A1 Apr. 5, 2018

(30) Foreign Application Priority Data

Oct. 3, 2016 (GB) .................................... 1616794.2

(51) Int. Cl.
*H04N 19/42* (2014.01)
*H04N 19/103* (2014.01)
*H04N 19/154* (2014.01)

(52) U.S. Cl.
CPC ........... *H04N 19/42* (2014.11); *H04N 19/103* (2014.11); *H04N 19/154* (2014.11)

(58) Field of Classification Search
CPC .... H04N 19/42; H04N 19/132; H04N 19/103; H04N 19/154
USPC .................................................. 375/240.26
See application file for complete search history.

(56) References Cited

U.S. PATENT DOCUMENTS

| 7,995,657 | B2* | 8/2011 | Cheong | H04N 19/176 375/240.25 |
| 8,059,721 | B2* | 11/2011 | Chang | H04N 19/61 375/240.18 |
| 8,249,145 | B2* | 8/2012 | Chang | H04N 19/61 375/240.01 |
| 8,259,813 | B2* | 9/2012 | Hvidsten | G06T 5/003 345/589 |

(Continued)

FOREIGN PATENT DOCUMENTS

| EP | 0742674 A2 | 11/1996 |
| GB | 2554680 | 4/2016 |
| WO | WO 03/056839 | 7/2003 |

OTHER PUBLICATIONS

Joshi et al, Low complexity hardware implementation of quantization and CAVLC for H.264 Encoder (Year: 2014).*

(Continued)

*Primary Examiner* — Shan E Elahi
(74) *Attorney, Agent, or Firm* — Vierra Magen Marcus LLP

(57) ABSTRACT

A set of encoding options to use when encoding an array of data elements is selected based on a bit count value and a distortion value for that set of encoding options. The distortion value is determined from a set of error values that represents the difference between a set of frequency domain coefficients and a set of de-quantised coefficients. The set of frequency domain coefficients are generated by applying only a subset of row transformations or only a subset of column transformations. A set of quantised coefficients are generated by quantising only a subset of the set of frequency domain coefficients. This arrangement provides a more efficient way of selecting encoding options, but without a detrimental reduction in the efficacy of the selection process.

17 Claims, 6 Drawing Sheets

(56) References Cited

U.S. PATENT DOCUMENTS

| | | | | |
|---|---|---|---|---|
| 8,351,513 | B2* | 1/2013 | Wen | H04N 19/139 |
| | | | | 375/240.16 |
| 8,437,404 | B2* | 5/2013 | Luna | H04N 19/70 |
| | | | | 375/240.23 |
| 8,472,530 | B2* | 6/2013 | Kim | H04N 19/172 |
| | | | | 375/240.25 |
| 8,654,859 | B1 | 2/2014 | Linzer | |
| 8,665,960 | B2* | 3/2014 | Zheludkov | H04N 19/56 |
| | | | | 375/240.13 |
| 8,700,794 | B2* | 4/2014 | Kim | H04N 21/23432 |
| | | | | 341/106 |
| 8,724,916 | B2* | 5/2014 | Regunathan | H04N 19/122 |
| | | | | 382/248 |
| 9,571,840 | B2* | 2/2017 | Regunathan | H04N 19/197 |
| 2005/0094729 | A1* | 5/2005 | Yuan | H04N 19/61 |
| | | | | 375/240.16 |
| 2005/0276493 | A1 | 12/2005 | Xin | |
| 2007/0237236 | A1 | 10/2007 | Chang | |
| 2008/0165861 | A1* | 7/2008 | Wen | H04N 19/139 |
| | | | | 375/240.26 |
| 2008/0243971 | A1 | 10/2008 | Po | |
| 2008/0260278 | A1* | 10/2008 | Zuo | H04N 19/176 |
| | | | | 382/251 |
| 2010/0262712 | A1* | 10/2010 | Kim | H04N 21/23432 |
| | | | | 709/231 |
| 2012/0155532 | A1* | 6/2012 | Puri | H04N 19/124 |
| | | | | 375/240.02 |
| 2013/0301738 | A1* | 11/2013 | Kim | H04N 19/176 |
| | | | | 375/240.18 |
| 2014/0016708 | A1* | 1/2014 | Wang | H04N 19/70 |
| | | | | 375/240.25 |
| 2014/0140399 | A1* | 5/2014 | Seregin | H04N 19/105 |
| | | | | 375/240.12 |
| 2014/0301463 | A1* | 10/2014 | Rusanovskyy | H04N 19/52 |
| | | | | 375/240.14 |
| 2014/0307781 | A1* | 10/2014 | He | H04N 19/176 |
| | | | | 375/240.03 |
| 2014/0362905 | A1* | 12/2014 | Nguyen | H04N 19/126 |
| | | | | 375/240.03 |
| 2015/0016512 | A1* | 1/2015 | Pu | H04N 19/176 |
| | | | | 375/240.03 |
| 2015/0016536 | A1* | 1/2015 | Hsieh | H04N 19/61 |
| | | | | 375/240.18 |
| 2015/0110167 | A1* | 4/2015 | Chen | H04N 19/70 |
| | | | | 375/240.01 |
| 2015/0117519 | A1* | 4/2015 | Kim | H04N 19/136 |
| | | | | 375/240.02 |
| 2015/0139331 | A1* | 5/2015 | Hsieh | H04N 19/122 |
| | | | | 375/240.18 |
| 2015/0172661 | A1* | 6/2015 | Dong | H04N 19/51 |
| | | | | 375/240.03 |
| 2015/0288964 | A1* | 10/2015 | Puri | H04N 19/124 |
| | | | | 375/240.03 |
| 2015/0326877 | A1* | 11/2015 | Narroschke | H04N 19/46 |
| | | | | 375/240.12 |
| 2016/0094855 | A1 | 3/2016 | Zhou | |
| 2016/0105688 | A1* | 4/2016 | Hendry | H04N 19/44 |
| | | | | 375/240.25 |
| 2016/0134877 | A1* | 5/2016 | Chong | H04N 19/105 |
| | | | | 375/240.02 |
| 2016/0165234 | A1* | 6/2016 | Kim | H04N 19/176 |
| | | | | 375/240.03 |

OTHER PUBLICATIONS

GB Combined Search and Examination Report dated Mar. 15, 2017, GB Patent Application No. GB1616794.2.
GB Search Report dated Jul. 12, 2017, GB Patent Application No. GB1616794.2.
GB Combined Search and Examination Report dated Apr. 25, 2018, GB Patent Application GB1717546.4.
U.S. Appl. No. 16/169,674, filed Oct. 24, 2018.

* cited by examiner

SELECTING ENCODING OPTIONS TO USE WHEN ENCODING AN ARRAY OF DATA ELEMENTS

BACKGROUND

The technology described herein relates to a method of and apparatus for selecting encoding options to use when encoding an array of data elements of a stream of arrays of data elements.

It is common to encode a stream of arrays of data elements, such as arrays of image data values (e.g. frames of video for display), so as to compress the data in order to reduce bandwidth and memory consumption. This is particularly desirable in data processing apparatus, e.g. of portable devices, where processing resources and power may be limited.

In order to encode a stream of arrays of data elements, each array of data elements is often divided into smaller "source" blocks of data elements and encoded on a block by block basis based on the difference between the source block and a "reference" block of data elements that is derived from one or more arrays of the stream of arrays.

The particular encoding options to use when encoding an array typically vary from region to region of the array. For example, the particular size of the source block(s), the particular way in which the reference block(s) are derived, etc., may be different for different regions of the array.

The particular encoding options to use when encoding an array are often selected using a process known as "Rate Distortion Optimisation" (RDO). The RDO process typically involves calculating cost values for various different sets of encoding options for a region and then selecting one or more particular sets of encoding options to use when encoding that region of the array that have an acceptably low cost value.

BRIEF DESCRIPTION OF THE DRAWINGS

Various embodiments of the technology described herein will now be described by way of example only and with reference to the accompanying drawings, in which.

Figure 1:
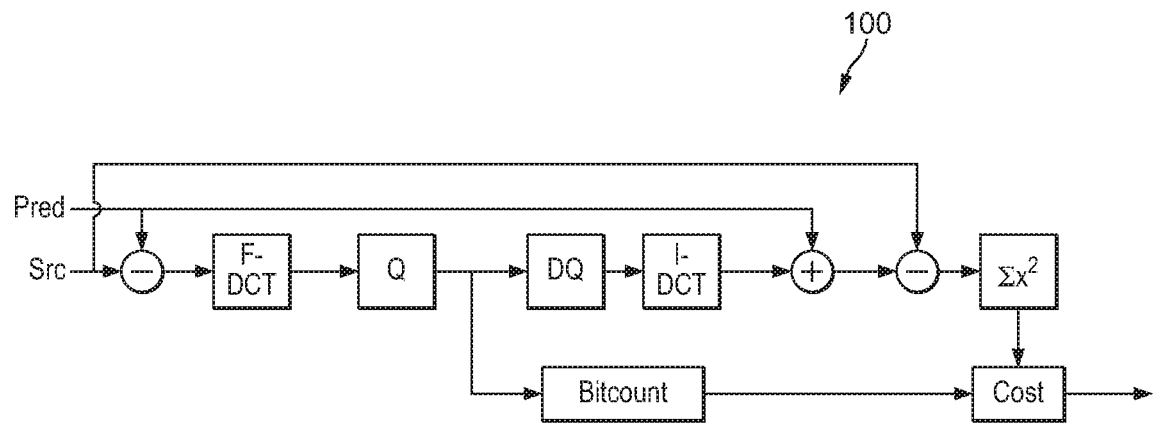
FIG. 1 illustrates a method of determining a cost value for a particular set of encoding options.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

DETAILED DESCRIPTION

An example RDO process 100 for calculating a cost value for one particular set of encoding options under consideration is shown in FIG. 1.

The RDO process 100 of FIG. 1 initially comprises subtracting (−) the data elements of a particular source block (Src) for a region from the data elements of a particular reference block (Pred) to generate a set of difference values. A forward discrete cosine transformation process (F-DCT) is then applied to the set of difference values to generate a set of frequency domain coefficients. A quantisation process (Q) is then applied to the set of frequency domain coefficients to generate a set of quantised coefficients.

These steps essentially replicate the steps that would be applied prior to encoding the coefficients for the source block, for example using entropy encoding. Thus, at this point, a bit count process (Bitcount) can be applied to the set of quantised coefficients to determine a bit count cost that would be incurred when encoding the source block in accordance with the particular set of encoding options under consideration.

A de-quantisation process (DQ) is then applied to the set of quantised coefficients to generate a set of de-quantised coefficients. An inverse discrete cosine transformation process (I-DCT) is then applied to the set of de-quantised coefficients to generate a set of reconstructed difference values. The set of reconstructed difference values is then added (+) to the reference block to generate a reconstructed source block.

These steps essentially replicate the steps that would be applied so as to reconstruct the source block subsequent to decoding the encoded coefficients for the source block. Thus, at this point, the data elements of the reconstructed source block are subtracted (−) from the data elements of the original source block to generate a set of error values and a sum-square distortion measuring process ($\Sigma x^2$) is then applied to the set of error values to determine the total amount of distortion that would be introduced when encoding and then decoding the source block in accordance with the particular set of encoding options under consideration.

A cost value process (Cost) is then performed to determine an overall cost value for the particular set of encoding options from the bit count value and the distortion value.

The RDO process of FIG. 1 is then repeated in accordance with various different sets of encoding options for the region (e.g. different source block sizes, differently derived reference blocks, etc.) to produce a cost value for each of those different sets of encoding options. One or more sets of encoding options to use when encoding the region of the array are then selected based on the cost values for the different sets of encoding options.

The RDO process is also repeated across the array of data elements to select the sets of encoding options to use when encoding the remaining regions of the array of data elements.

Although the above-described RDO process provides a comprehensive way to select encoding options to use when encoding an array of data elements, the process comprises a number of steps that can be very expensive in terms of processing resources and power, such as transformation and quantisation steps.

It is, however, generally desirable in data processing apparatus, e.g. of portable devices, to try to reduce the amount of processing resources and power used, but ideally without a significant detrimental reduction in the efficacy of the processes being performed.

The Applicants accordingly believe that there remains scope for improved arrangements for selecting encoding options.

An embodiment of the technology described herein comprises a method of selecting encoding options to use when encoding an array of data elements of a stream of arrays of data elements, the method comprising:

in accordance with a particular set of encoding options:
  generating a set of difference values that represents the difference between a source block of data elements of the array of data elements and a reference block of data elements derived from one or more arrays of data elements of the stream of arrays of data elements;
  generating a set of frequency domain coefficients for the set of difference values by applying a forward transformation process to the set of difference values;
  generating a set of quantised coefficients by applying a quantisation process to the set of frequency domain coefficients;
  determining a bit count value for the particular set of encoding options from the set of quantised coefficients;
  generating a set of de-quantised coefficients by applying a de-quantisation process to the set of quantised coefficients;
  generating a set of error values that represents the difference between the set of frequency domain coefficients and the set of de-quantised coefficients;
  determining a distortion value for the particular set of encoding options from the set of error values; and
  selecting, based on the bit count value and the distortion value, whether to encode the source block in accordance with the particular set of encoding options.

Another embodiment of the technology described herein comprises a data processing apparatus for selecting encoding options to use when encoding an array of data elements of a stream of arrays of data elements, the data processing apparatus comprising processing circuitry configured to:

in accordance with a particular set of encoding options:
  generate a set of difference values that represents the difference between a source block of data elements of the array of data elements and a reference block of data elements derived from one or more arrays of data elements of the stream of arrays of data elements;
  generate a set of frequency domain coefficients for the set of difference values by applying a forward transformation process to the set of difference values;
  generate a set of quantised coefficients by applying a quantisation process to the set of frequency domain coefficients;
  determine a bit count value for the particular set of encoding options from the set of quantised coefficients;
  generate a set of de-quantised coefficients by applying a de-quantisation process to the set of quantised coefficients;
  generate a set of error values that represents the difference between the set of frequency domain coefficients and the set of de-quantised coefficients;
  determine a distortion value for the particular set of encoding options from the set of error values; and
  select, based on the bit count value and the distortion value, whether to encode the source block in accordance with the particular set of encoding options.

Thus, in these embodiments of the technology described herein, a set of error values that is used to determine a distortion value is generated from a set of de-quantised coefficients and a set of frequency domain coefficients, for example rather than generating that set of error values from a reconstructed source block and the original source block itself (as is the case in the RDO process shown in FIG. 1).

As will be discussed in more detail below, the Applicants have identified that this alternative approach for generating the set of error values provides an acceptable approximation of the distortion, but without the need, for example, to perform an inverse transformation process so as to generate a reconstructed source block (which can be expensive in terms of processing resources and power). The technology described herein can, therefore, significantly reduce the amount of processing resources and power needed to select encoding options to use when encoding an array of data elements.

In any of the embodiments described herein the arrays of data elements of the stream of arrays may take any desired and suitable form. In embodiments, the arrays of data elements may each correspond to an array of data positions. The arrays of data elements or positions may correspond to all or part of a desired (e.g. image) output, such as a frame (e.g. for display). There may be any desired and suitable correspondence between the data elements or positions and the desired output. Thus, the data elements or positions of the arrays may each correspond to a pixel or pixels of a desired output. The arrays of data elements can be any desired and suitable size or shape in terms of data elements or positions, but may be rectangular (including square). The data elements may also have any desired and suitable format, for example that represents image data values (e.g. colour values).

In any of the embodiments described herein the source block may take any desired and suitable form. In embodiments, the source block can be any desired and suitable size or shape in terms of data elements or positions, but may be rectangular (including square). For example, the source block may be 4×4, 4×8, 8×4, 8×8, 8×16, 16×8, 16×16, 16×32, 32×16, 32×32, 32×64, 64×32, 64×64 etc., data elements or positions in size. In embodiments, the source block may be one of plural blocks that the array of data elements may be divided into for encoding purposes. These plural blocks may be non-overlapping and/or may be similar or different in size or shape. The array of data elements can be any desired and suitable size, shape or configuration in terms of such blocks.

In any of the embodiments described herein the reference block may be derived in any desired and suitable way. In embodiments, the reference block may be derived from the same array of data elements as the source block (using an "intra" mode). Alternatively, the reference block may be derived from one or more different arrays of data elements in the stream of arrays (using an "inter" mode). The one or more different arrays may comprise one or more previous arrays of data elements (using a "forwards" mode) and/or one or more subsequent arrays of data elements (using a "backwards" mode). In these embodiments, the reference block may be derived only from one or more previous arrays of data elements or only from one or more subsequent arrays of data elements (using a "uni-directional" mode). Alternatively, the reference block may be derived from both one or more previous arrays of data elements and from one or more subsequent arrays of data elements (using a "bi-directional" mode). Where the reference block is derived from plural different arrays of data elements, data elements of the plural different arrays may be combined, e.g. averaged. In embodiments, the reference block for the source block may be derived in the same or in a substantially similar manner to another reference block that is derived for another source block that is adjacent to the source block (using a "merge" mode).

In embodiments, the method may further comprise performing, and the apparatus may further comprise processing circuitry configured to perform, a search process (e.g. an intra search and/or an inter search (as part of a motion estimation process)) that selects one or more candidate reference blocks. The one or more candidate reference blocks may be selected based on a similarity or difference metric, such as a sum of absolute differences (SAD) value, with respect to the source block. The reference block may be one of the one or more candidate reference blocks.

In embodiments, the method may further comprise performing, and the apparatus may further comprise processing circuitry configured to perform, a motion estimation process that determines one or more motion vectors. As will be appreciated, the one or more motion vectors may indicate how to derive the data elements of the reference block from the one or more arrays of data elements (e.g. by translating, rotating, scaling, etc.). The method may further comprise performing, and the apparatus may further comprise processing circuitry configured to perform, a motion compensation process that applies the one or more motion vectors to the one or more arrays of data elements to derive the reference block. Thus, in embodiments, the reference block may comprise a motion-compensated "prediction" block. As will be appreciated, using motion compensation can, for example, reduce the difference between the reference block and the source block. This in turn can reduce the bit count value and/or distortion value.

In embodiments in which the reference block for the source block is derived in the same or in a substantially similar manner to another reference block that is derived for another source block that is adjacent to the source block (using "merge" mode), deriving the reference block may comprise using the same vector to derive the reference block for the source block as the vector that is used to derive said another reference block for said another source block.

The reference block may correspond in size and/or shape (in terms of array elements) to the size and/or shape of the source block.

In any of the embodiments described herein, the particular set of encoding options may be characterised by any one or more encoding options as desired. The one or more encoding options that characterise the particular set of encoding options may include, for example, the particular size of the source block (in terms of data elements), the particular way in which the reference block is derived (e.g. the mode used, such as intra, inter, forward, backward, uni-directional, bi-directional, merge, etc. mode, and/or the motion vector used).

As will be discussed below, one or more different sets of encoding options may also be considered for selection when encoding the array of data elements. The one or more encoding options that characterise the particular set of encoding options may accordingly differentiate that particular set of encoding options from the one or more different sets of encoding options that are considered for selection.

In any of the embodiments described herein, the arrays of data elements may be provided in any desired and suitable way. Embodiments may comprise generating (at least some or all of) the data elements of the arrays. Embodiments may also or instead comprise reading in (at least some or all of) the data elements of the arrays, e.g. from memory.

The data elements of the arrays may be generated in any desired and suitable way. In embodiments, the data elements of the arrays may be generated by a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments). A graphics processing pipeline may be used in order to generate the data elements of the arrays. The graphics processing pipeline may contain any suitable and desired processing stages that graphics pipeline may contain, such as a vertex shader, a rasterisation stage, a rendering stage, etc., in order to generate the data elements of the arrays.

In any of the embodiments described herein, generating the set of difference values can take any desired and suitable form. In embodiments, generating the set of difference values may comprise subtracting the values of the data elements of the source block respectively from the values of the corresponding (in terms of data position) data elements of the reference block, or vice versa.

In any of the embodiments described herein, the forward transformation process can take any desired and suitable form that generates a set of frequency domain coefficients. In embodiments, the forward transformation process may be substantially linear and/or orthogonal and/or invertible and/or discrete. The forward transformation process may be defined by the particular standard (e.g. MPEG standard) to be used when encoding the array of data elements. The forward transformation process may, for example, be a forward Discrete Cosine Transform (DCT).

The set of difference values may comprise an array of difference values. The set of difference values may correspond in size and/or shape (in terms of array elements) to the size and/or shape of the source block and/or the reference block. The forward transformation process may comprise applying respective forward transformations to the rows of the array of difference values and then applying respective forward transformations to the columns of the resultant row-transformed array, or vice versa. For example, the forward transformation process may comprise applying respective forward transformations to each and every row of the array of difference values and then to each and every column of the resultant row-transformed array, or vice versa.

However, the Applicants have further identified that it is not always necessary to apply a "complete" set of forward transformations. This is because Parseval's Theorem may apply and the distortion value may be substantially invariant under the transformation process.

Thus, in embodiments, the forward transformation process may comprise applying only a subset of row transformations or only a subset of column transformations. For example, the forward transformation process may comprise applying respective forward transformations to each and every row of the array of difference values and then applying respective forward transformations to only a subset of the columns of the resultant row-transformed array, or vice versa.

These embodiments can further significantly reduce the amount of processing resources and power needed to select a set of encoding options to use when encoding an array of data elements by reducing the number of forward transformations applied.

Indeed it is believed that these embodiments are new and advantageous in their own right and not merely in the context of the other embodiments described herein.

Thus, another embodiment of the technology described herein comprises a method of selecting encoding options to use when encoding an array of data elements of a stream of arrays of data elements, the method comprising:

in accordance with a particular set of encoding options:
  generating a set of difference values that represents the difference between a source block of data elements of the array of data elements and a reference block of data elements derived from one or more arrays of data elements of the stream of arrays of data elements;
  generating a set of frequency domain coefficients for the set of difference values by applying a forward transformation process to the set of difference values, wherein the forward transformation process comprises applying only a subset of row transformations or only a subset of column transformations;
  generating a set of quantised coefficients by applying a quantisation process to the set of frequency domain coefficients;
  determining a bit count value for the particular set of encoding options from the set of quantised coefficients;
  generating a set of de-quantised coefficients by applying a de-quantisation process to the set of quantised coefficients;
  generating a set of error values using the set of de-quantised coefficients;
  determining a distortion value for the particular set of encoding options from the set of error values; and
  selecting, based on the bit count value and the distortion value, whether to encode the source block in accordance with the particular set of encoding options.

Another embodiment of the technology described herein comprises a data processing apparatus for selecting encoding options to use when encoding an array of data elements of a stream of arrays of data elements, the data processing apparatus comprising processing circuitry configured to:

in accordance with a particular set of encoding options:
  generate a set of difference values that represents the difference between a source block of data elements of the array of data elements and a reference block of data elements derived from one or more arrays of data elements of the stream of arrays of data elements;
  generate a set of frequency domain coefficients for the set of difference values by applying a forward transformation process to the set of difference values, wherein the forward transformation process comprises applying only a subset of row transformations or only a subset of column transformations;
  generate a set of quantised coefficients by applying a quantisation process to the set of frequency domain coefficients;
  determine a bit count value for the particular set of encoding options from the set of quantised coefficients;
  generate a set of de-quantised coefficients by applying a de-quantisation process to the set of quantised coefficients;
  generate a set of error values using the set of de-quantised coefficients;
  determine a distortion value for the particular set of encoding options from the set of error values; and
  select, based on the bit count value and the distortion value, whether to encode the source block in accordance with the particular set of encoding options.

In these embodiments of the technology described herein, forward transformations may be applied either to each and every row or to each and every column of the array of difference values. This can allow, for example, for all of the difference values of the set of difference values to have at least some influence on the set of frequency coefficients that are generated. As will be appreciated, when forward transformations are applied to each and every row of the array of difference values, forward transformations may then be applied to only a subset of the columns of the resultant row-transformed array. Alternatively, when forward transformations are applied to each and every column of the array of difference values, forward transformations may then be applied to only a subset of the rows of the resultant column-transformed array.

In embodiments, the subset of rows or columns to which the respective forward transformations are applied may be any desired and suitable subset (i.e. some but not all) of the rows or columns. In embodiments, the subset of rows or columns may comprise (at least) a fraction (e.g. ½) the number of rows or columns of the resultant array (e.g. forward transformations may be applied to all of the rows but to only half of the columns, or vice versa). This may (approximately) reduce the amount of forward transformation processing required by a corresponding fraction (e.g. by around ¼). For example, 16 forward transformations for an 8×8 set of difference values may be reduced to 12 forward transformations (8 row transformations plus 4 column transformations, or vice versa).

In embodiments, the subset of rows or columns may comprise the rows or columns at or towards the top or left of the resultant array (e.g. the top portion (e.g. half) of the rows of the array or the left portion (e.g. half) of the columns of the resultant array).

As will be appreciated, the set of frequency domain coefficients may contain only a subset of "fully" calculated frequency domain coefficients, with the remaining frequency domain coefficients being only partially calculated. In embodiments, the remaining frequency domain coefficients that are not fully calculated may be handled as desired. For example, the remaining frequency domain coefficients may be left as they are or set to a selected value, such as zero.

As will be appreciated, these embodiments in which only a subset of row transformations or only a subset of column transformations are applied can, and in some embodiments do, include any one or more or all of the optional features of the technology described herein as described herein in any embodiment, as appropriate.

Thus, for example, in embodiments, the set of error values that is generated using the set of de-quantised coefficients may represent the difference between the set of de-quantised coefficients and the set of frequency domain coefficients. The distortion value for the particular set of encoding options may then be generated from that set of error values.

However, in other embodiments, the set of error values that is generated using the set of de-quantised coefficients may represent the difference between a reconstructed source block and the source block itself (e.g. as is shown in the RDO process of FIG. 1). These embodiments may further comprise generating a set of reconstructed difference values by applying an inverse transformation process to the set of de-quantised coefficients. These embodiments may further comprise generating the reconstructed source block by combining the set of reconstructed difference values and the reference block. Combining the set of reconstructed difference values and the reference block may comprise adding together the difference values of the set of reconstructed difference values and the respective values of the corresponding (in terms of data position) data elements of the reference block.

In any of the embodiments described herein, the quantisation process can take any desired and suitable form. In embodiments, applying the quantisation process may comprise respectively quantising (e.g. division by a quantisation constant and/or truncating and/or rounding) the frequency domain coefficients of the set of frequency domain coefficients. The quantisation may be defined by the particular standard (e.g. MPEG standard) to be used when encoding the array of data elements.

The set of frequency domain coefficients may comprise an array of frequency domain coefficients. The set of frequency domain coefficients may correspond in size and/or shape (in terms of array elements) to the size and/or shape of the set of difference values, the source block, and/or the reference block.

The quantisation process may comprise quantising all of the frequency domain coefficients of the set of frequency domain coefficients.

However, the Applicants have further identified that it is not always necessary to quantise a "complete" set of the frequency domain coefficients. This is because most of the distortion may be present in only a subset of the set of frequency domain coefficients.

Thus, in embodiments, applying the quantisation process may comprise quantising only a subset of the set of frequency domain coefficients. These embodiments can further significantly reduce the amount of processing resources and power needed to select encoding options to use when encoding an array of data elements by reducing the number of quantisations applied.

Indeed it is believed that these embodiments are new and advantageous in their own right and not merely in the context of the other embodiments described herein.

Thus, another embodiment of the technology described herein comprises a method of selecting encoding options to use when encoding an array of data elements of a stream of arrays of data elements, the method comprising:
in accordance with a particular set of encoding options:
generating a set of difference values that represents the difference between a source block of data elements of the array of data elements and a reference block of data elements derived from one or more arrays of data elements of the stream of arrays of data elements;
generating a set of frequency domain coefficients for the set of difference values by applying a forward transformation process to the set of difference values;
generating a set of quantised coefficients by applying a quantisation process to the set of frequency domain coefficients, wherein applying the quantisation process comprises quantising only a subset of the set of frequency domain coefficients;
determining a bit count value for the particular set of encoding options from the set of quantised coefficients;
generating a set of de-quantised coefficients by applying a de-quantisation process to the set of quantised coefficients;
generating a set of error values using the set of de-quantised coefficients;
determining a distortion value for the particular set of encoding options from the set of error values; and
selecting, based on the bit count value and the distortion value, whether to encode the source block in accordance with the particular set of encoding options.

Another embodiment of the technology described herein comprises a data processing apparatus for selecting encoding options to use when encoding an array of data elements of a stream of arrays of data elements, the data processing apparatus comprising processing circuitry configured to:
in accordance with a particular set of encoding options:
generate a set of difference values that represents the difference between a source block of data elements of the array of data elements and a reference block of data elements derived from one or more arrays of data elements of the stream of arrays of data elements;
generate a set of frequency domain coefficients for the set of difference values by applying a forward transformation process to the set of difference values;
generate a set of quantised coefficients by applying a quantisation process to the set of frequency domain coefficients, wherein applying the quantisation process comprises quantising only a subset of the set of frequency domain coefficients;
determine a bit count value for the particular set of encoding options from the set of quantised coefficients;
generate a set of de-quantised coefficients by applying a de-quantisation process to the set of quantised coefficients;
generate a set of error values using the set of de-quantised coefficients;
determine a distortion value for the particular set of encoding options from the set of error values; and
select, based on the bit count value and the distortion value, whether to encode the source block in accordance with the particular set of encoding options.

In these embodiments, the subset of frequency domain coefficients that are quantised may be any desired and suitable subset (i.e. some but not all) of the set of frequency domain coefficients. The subset of frequency domain coefficients that are quantised may comprise coefficients that are expected to have a relatively greater influence on the bit count value and/or distortion value than the remaining coefficients that are not quantised. For example, the subset of frequency domain coefficients that are quantised may comprise a subset of relatively lower frequency coefficients of the set of frequency domain coefficients.

In embodiments, the subset of frequency domain coefficients that are quantised may comprise (at least) a fraction (e.g. ¼) of the number of frequency domain coefficients. This may (approximately) reduce the amount of quantisation processing required by a corresponding fraction (e.g. by around ¾). For example, 64 quantisations for an 8×8 set of frequency domain coefficients may be reduced to 16 quantisations for a 4×4 subset of the frequency domain coefficients.

In embodiments, the subset of frequency domain coefficients that are quantised may comprise the frequency domain coefficients towards the top-left of an array of frequency domain coefficients (e.g. the top-left portion (e.g. quadrant) of coefficients of an array of frequency domain coefficients).

In embodiments, the remaining frequency domain coefficients that are not quantised may be handled as desired. For example, the remaining frequency domain coefficients may be set to a selected value, such as zero.

As will be appreciated, these embodiments in which only a subset of the set of frequency domain coefficients are quantised can, and in some embodiments do, include any one or more or all of the optional features of the technology described herein as described herein in any embodiment, as appropriate.

Thus, for example, in embodiments, the set of error values that is generated using the set of de-quantised coefficients may represent the difference between the set of de-quantised coefficients and the set of frequency domain coefficients. The distortion value for the particular set of encoding options may then be generated from that set of error values.

However, in other embodiments, the set of error values that is generated using the set of de-quantised coefficients may represent the difference between a reconstructed source block and the source block itself (e.g. as is shown in FIG. 1). These embodiments may further comprise generating a set of reconstructed difference values by applying an inverse transformation process to the set of de-quantised (and zeroed) coefficients. These embodiments may further comprise generating the reconstructed source block by combining the set of reconstructed difference values and the reference block. Combining the set of reconstructed difference values and the reference block may comprise adding together the difference values of set of reconstructed difference values and the respective values of the corresponding (in terms of data position) data elements of the reference block.

For another example, in embodiments, the forward transformation process may comprise applying only a subset of row transformations or only a subset of column transformations. In these embodiments, the subset of frequency domain coefficients that are quantised may comprise the subset of frequency domain coefficients that are fully calculated when applying the forward transformation process. Alternatively, in other embodiments, the forward transformation process may comprise applying a complete set of (row and column) forward transformations.

In any of the embodiments described herein, the bit count value can be determined in any desired and suitable way. In embodiments, determining the bit count value may comprise counting the bits needed to represent the set of quantised coefficients.

The set of quantised coefficients may comprise an array of quantised (and zeroed) coefficients. The set of quantised (and zeroed) coefficients may correspond in size and/or shape (in terms of array elements) to the size and/or shape of the set of frequency domain coefficients, the set of difference values, the source block, and/or the reference block.

In any of the embodiments described herein, the de-quantisation process can take any desired and suitable form, for example that corresponds to the quantisation process. In embodiments, the de-quantisation process may comprise respectively de-quantising (e.g. multiplying by a quantisation constant and/or padding with zeros) the quantised (and zeroed) coefficients of the set of quantised coefficients. The de-quantisation may be defined by the particular standard (e.g. MPEG standard) to be used when encoding the array of data elements.

The set of de-quantised coefficients may comprise an array of de-quantised (and zeroed) coefficients. The set of de-quantised (and zeroed) coefficients may correspond in size and/or shape (in terms of array elements) to the size and/or shape of the set of quantised (and zeroed) coefficients, the set of frequency domain coefficients, the set of difference values, the source block, and/or the reference block.

In any of the embodiments described herein, the inverse transformation process (if applied) can take any desired and suitable form that corresponds to the forward transformation process. In embodiments, the inverse transformation process may be substantially linear and/or orthogonal and/or invertible and/or discrete. The inverse transformation process may be defined by the particular standard (MPEG standard) to be used when encoding the array of data elements. The inverse transformation process may, for example, be an inverse Discrete Cosine Transform (DCT), In any of the embodiments described herein, the set of error values can be generated in any desired and suitable way.

In some embodiments, the set of error values represents the difference between the set of frequency domain coefficients and the set of de-quantised coefficients. In these embodiments, generating the set of error values may comprise subtracting the values of the de-quantised coefficients of the set of de-quantised coefficients respectively from the values of the corresponding (in terms of data position) frequency domain coefficients of the set of frequency domain coefficients, or vice versa.

However, in other embodiments, the set of error values may represent the difference between a reconstructed source block and the source block itself. In these embodiments, generating the set of error values may comprise subtracting the values of the data elements of the reconstructed source block respectively from the values of the corresponding (in terms of data position) data elements of the source block, or vice versa.

In any of the embodiments described herein, the set of error values may comprise an array of error values. The set of error values may correspond in size and/or shape (in terms of array elements) to the size and/or shape of the set of de-quantised (and zeroed) coefficients, the set of quantised (and zeroed) coefficients, the set of frequency domain coefficients, the set of difference values, the source block, and/or the reference block.

In any of the embodiments described herein, the distortion value for the particular set of encoding options can be determined in any desired and suitable way. In embodiments, determining the distortion value may comprise determining a sum-square of the error values of the set of error values.

In any of the embodiments described herein, selecting, based on the bit count value and the distortion value, whether to encode the source block in accordance with the particular set of encoding options can be performed in any desired and suitable way. In embodiments, selecting whether to encode the source block in accordance with the particular set of encoding options may comprise determining a cost value for the particular set of encoding options based on the bit count value and the distortion value, and selecting, based on the cost value, whether to encode the source block in accordance with the particular set of encoding options. Determining the cost value may comprise combining the bit count value and the distortion value. The combination of the bit count value and the distortion value may be any suitable and desired combination, such as a weighted combination of the bit count value and the distortion value.

In embodiments, the particular set of encoding options may be selected when the bit count value and/or the distortion value and/or the cost value is the lowest such value of plural such values determined for respective different sets of encoding options. The particular set of encoding options may also or instead be selected when the bit count value and/or the distortion value and/or the cost value is below a selection threshold for such a value.

As will be appreciated, the selecting processes that are performed in accordance with the particular set of encoding options may, in practice, be performed respectively for each (e.g. every) one of plural different sets of encoding options. This can allow, for example, for a more suitable set of encoding options to be selected. As discussed above, the different sets of encoding options may be characterised by, and may differ in respect of, one or more encoding options as desired. As discussed above, the one or more encoding options that characterise the sets of encoding options may include, for example, the particular size of the source block (in terms of data elements), the particular way in which the reference block is derived, etc.

In any of the embodiments described herein, selecting a set of encoding options to use when encoding the array of data elements may be followed by performing an encoding process that encodes the source block in accordance with the selected set of encoding options. Thus, the data processing apparatus may comprise processing circuitry configured to perform an encoding process that encodes the source block in accordance with the selected set of encoding options.

The encoding process may comprise, when the particular set of encoding options is selected for use when encoding the source block, encoding the source block in accordance with the selected particular set of encoding options. Alternatively, the encoding process may comprise, when the particular set of encoding options is not selected for use when encoding the source block, not encoding the source block in accordance with the particular set of encoding options. In this case, the region of the array of data elements that corresponds to the source block may be encoded in accordance with a selected different set of encoding options.

The encoding process can take any desired and suitable form. The encoding process may be defined by the standard (e.g. MPEG standard) to be used when encoding the array of data elements. In embodiments, the encoding process may comprise entropy encoding.

As will be appreciated, the encoding process may comprise generating a set of difference values that represents the difference between the source block and the reference block for the selected set of encoding options, generating a set of frequency domain coefficients for the set of difference values by applying a (e.g. complete) forward transformation process to the set of difference values, and/or generating a set of quantised coefficients by applying a (e.g. complete) quantisation process to the set of frequency domain coefficients. The (e.g. entropy) encoding may then be performed on the set of quantised coefficients.

As will be appreciated, any of the processes that are performed in respect of a source block that corresponds to a region of the array may, in practice, be performed respectively for each (e.g. every) one of plural source blocks that correspond to the region or that correspond respectively to plural (different) regions of the array.

As will also be appreciated, any of the processes that are performed in respect of an array may, in practice, be performed respectively for each (e.g. every) one of plural arrays of the stream of arrays.

In any of the embodiments described herein, once encoded, the encoded source block(s) and/or encoded array and/or encoded stream of arrays may be used in any desired and suitable way. For example, the encoded source block(s) and/or encoded array and/or encoded stream of arrays may be output, e.g. stored in memory and/or streamed to another device. Thus, the data processing apparatus may comprise output circuitry (e.g. write out circuitry) configured to output (e.g. write out) the encoded source block(s) and/or encoded array and/or encoded stream of arrays, e.g. to memory or to another device. The one or more motion vectors, if used, may also be output in a similar way.

The encoded source block(s) and/or encoded array and/or encoded stream of arrays may later be retrieved and/or received, e.g. for decoding. Thus, the data processing apparatus may comprise input circuitry (e.g. read in circuitry) configured to input (e.g. read in) the encoded source block(s) and/or encoded array and/or encoded stream of arrays, e.g. from memory. The one or more motion vectors, if used, may also be input in a similar way.

Encoding a source block may be followed by a decoding process that decodes the encoded source block. Thus, the data processing apparatus may comprise processing circuitry configured to perform a decoding process that decodes an encoded source block. The decoding process can take any desired and suitable form, for example that corresponds to the encoding process that was used when encoding the encoded source block. The decoding process may be defined by the standard (e.g. MPEG standard) that was used when encoding the array of data elements. For example, the decoding process may comprise entropy decoding.

As will be appreciated, the (e.g. entropy) decoding may comprise producing a set of quantised coefficients for the encoded source block. The decoding process may then comprise generating a set of de-quantised coefficients by applying a (complete) de-quantisation process to the set of quantised coefficients, generating a set of reconstructed difference values by applying a (complete) inverse transformation process to the set of de-quantised coefficients, and/or generating a reconstructed source block by combining the set of reconstructed difference values and the reference block. Combining the set of reconstructed difference values and the reference block may comprise adding together the difference values of the set of reconstructed difference values and the respective values of the corresponding (in terms of data position) data elements of the reference block.

As discussed above, the reference block may comprise a motion compensated prediction block. The decoding may accordingly further comprise a motion compensation process that applies one or more motion vectors to one or more decoded arrays of data elements to derive the reference block.

In any of the embodiments described herein, once determined, the data elements of the decoded source block may be used in any desired and suitable way.

For example, the data elements of the decoded source block may be output (e.g. by an output (e.g. display)

processor), e.g. for display. In these embodiments, the arrays of data elements may correspond to images, e.g. frames of image data, and the data elements may correspond to a pixel or pixels.

As will be appreciated, any of the processes that are performed in respect of an encoded source block of an encoded array may, in practice, be performed respectively for each (e.g. every) one of plural encoded source blocks of the encoded array.

As will also be appreciated, any of the processes that are performed in respect of an encoded array of an encoded stream of arrays may, in practice, be performed respectively for each (e.g. every) one of plural encoded arrays of the encoded stream of arrays.

The processes described herein in any embodiment may be performed by any desired and suitable apparatus. For example, the processes described herein in any embodiment may be performed by a video processor (codec). The data processing apparatus described herein in any embodiment may therefore comprise or may be a video processor. Thus, the processing circuitry, output circuitry or write out circuitry, input circuitry or read in circuitry, etc. described herein in any embodiment may form part of a video processor. The data processing apparatus described herein in any embodiment may comprise, or may be, or may form part of, a system on chip (SoC).

The memory referred to herein may be any desired and suitable memory of or for the data processing apparatus. The memory may be external to the data processing apparatus, e.g. video processor and/or system on chip (SoC). The memory may be, for example, main system memory.

The technology described herein can be used for all forms of data arrays that a data processing apparatus may provide and/or use, such as images or frames for display. Thus, as indicated above, the arrays of data elements may comprise image data and/or may correspond to images or frames of image data.

In an embodiment, the various functions of the technology described herein are carried out on a single data (e.g. image) processing platform that provides and/or uses the arrays of data elements.

As will be appreciated by those skilled in the art, the data processing apparatus of the technology described herein may be part of an overall data processing system that includes, for example, a host (e.g. central) processor. The host processor may, for example, execute applications that require data processing by the data processing apparatus. The host processor may send appropriate commands and data to the data processing apparatus to control it to perform the data processing operations and to generate and/or use an output required by applications executing on the host processor. To facilitate this, the host processor may execute a driver for the data processing apparatus and/or may execute a compiler or compilers for compiling programs to be executed by a programmable execution unit of the data processing apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a video camera that generates the arrays of data elements.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As discussed above, embodiments of the technology described herein relate to arrangements that comprise selecting encoding options to use when encoding an array of data elements. Various embodiments of the technology described herein will now be described in the context of the encoding frames of image data for display. However, the concepts described herein can equally be applied to contexts in which arrays of other types of data are to be encoded.

Figure 2:
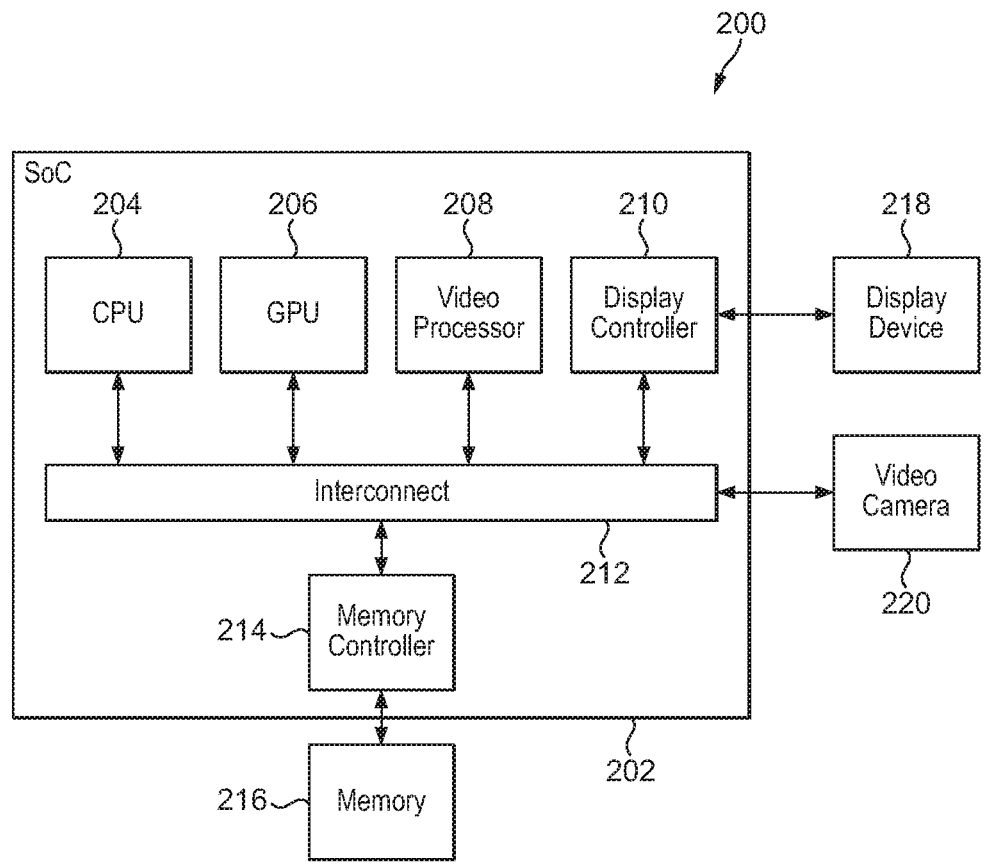
FIG. 2 shows schematically a data processing system according to embodiments of the technology described herein.

FIG. 2 shows schematically an embodiment of a data processing system 200 that can provide and use data arrays, such as frames for display, that have been encoded in the manner of the technology described herein.

In this embodiment, the system 200 comprises a data processing apparatus in the form of a system on chip (SoC) 202. The system 200 also comprises off-chip (main) memory 216, a display device 218 and a video camera 220.

The SoC 202 comprises a central processing unit (CPU) 204, a graphics processing unit (GPU) 206, a video processor 208, a display controller 210, an interconnect 212 and a memory controller 214.

As is shown in FIG. 2, the CPU 204, GPU 206, video processor 208, and display controller 210 communicate with each other via the interconnect 212 and with the memory 216 via the interconnect 212 and memory controller 214. The display controller 210 also communicates with the display device 218. The video camera 220 also communicates with the SoC 202 via the interconnect 212.

In the following embodiments, the video processor 208 reads in image data from memory 216, encodes the image data, and then outputs that encoded image data, e.g. for storage in memory 216 or for streaming to another device. The encoded image data can later be retrieved and decoded, e.g. by the video processor 208, or received and decoded by another device. The decoded image data can then be output, e.g. by the display controller 210 to the display device 218 or by another device, for display.

Figure 3:
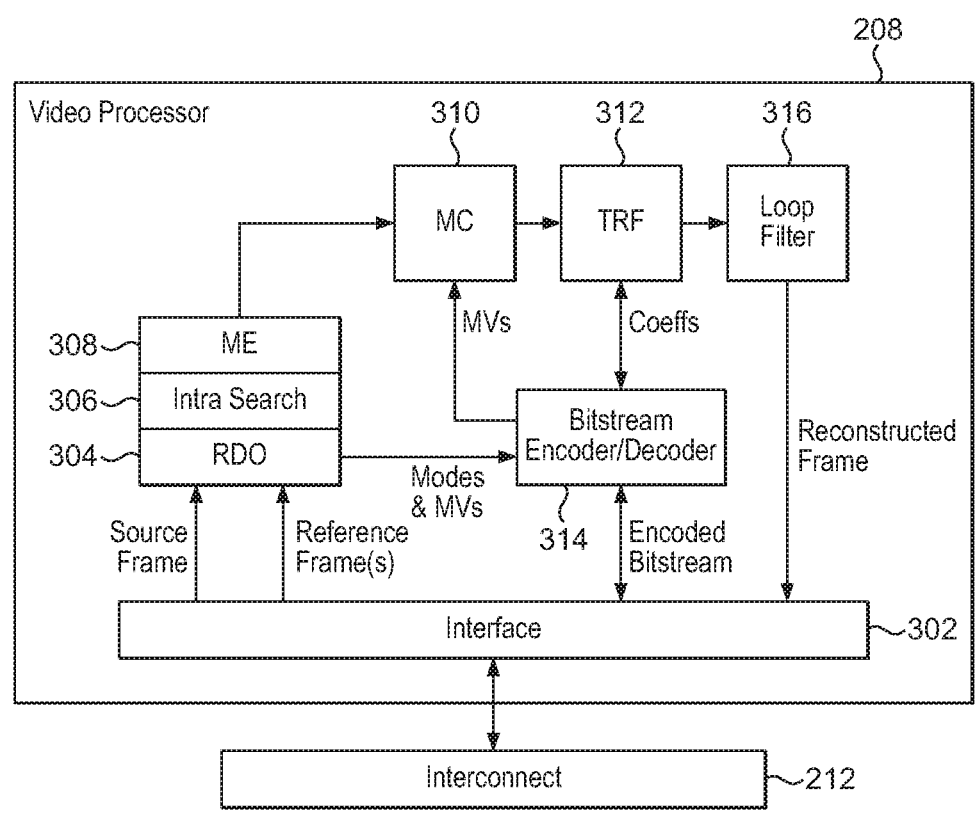
FIG. 3 shows schematically a data processing apparatus comprising a video processor according to embodiments of the technology described herein.

FIG. 3 shows further details of a video processor 208 that can be used to encode and decode a stream of arrays of data elements, such as frames for display, in the manner of the technology described herein.

In this embodiment, the video processor 208 comprises an interface 302 that can provide, via the interconnect 212, a current "source" frame to be encoded. In a similar manner, the interface 302 can provide, via the interconnect 212, one or more previous and/or subsequent "reference" frames that may be used when encoding the source frame.

In this embodiment, the source frame is divided into plural source blocks to be encoded on a block by block basis. Each source block is initially 16×16 data elements (pixels) in size. Each source block can, however, be further divided into two 16×8 or 8×16 source blocks or four 8×8 source blocks, if that would provide for less costly encoding. Each of these smaller source blocks can also be further divided into two 8×4 or 4×8 source blocks or four 4×4 source blocks, if that would provide for less costly encoding. Other source block sizes could of course be used as desired.

In this embodiment, a source block can be encoded using another block within the source frame itself, i.e. using "intra" mode encoding. The video processor 208 accordingly comprises inter search circuitry 306 that, for a given source block in the source frame, searches within the source frame itself for one or more suitable candidate reference blocks to consider using when encoding that source block. The one or more candidate reference blocks may be selected using any suitable metric that indicates the similarity or difference between the source block and the potential reference block in question, such as a sum of absolute differences (SAD) value.

In this embodiment, the one or more reference frames are also divided into plural blocks (which may correspond in size to the source block) that may be used when encoding the source frame, i.e. using "inter" mode encoding. The video processor 208 accordingly comprises ME (motion estimation) circuitry 308 that, for a given source block in the source frame, searches within the one or more reference frames for one or more suitable candidate reference blocks to consider using when encoding that source block. A candidate reference block can be derived by using a motion vector (MV) that describes how a particular block of a particular frame is mapped (e.g. by translation, rotation and/or scaling) to that candidate reference block. Again, the one or more candidate reference blocks may be selected using any suitable metric that indicates the similarity or difference between the source block and the potential reference block in question, such as a sum of absolute differences (SAD) value.

RDO (Rate Distortion Optimisation) circuitry 304 then performs an RDO process in respect of each source block using the candidate reference blocks for that source block. In this embodiment, the output of the RDO circuitry 304 comprises a selected set of encoding options for a particular source block (e.g. having a particular size in terms of data elements of the frame). In this embodiment, the selected set of encoding options further comprises a particular way to derive a reference block for that particular source block (e.g. the encoding mode to be used, such as intra, inter, unidirectional, bidirectional, merge, etc., mode, and/or the motion vector to be used).

An RDO process in which the video processor 208 selects a set of encoding options to use when encoding an array of data elements of a stream of arrays of data elements, such as a stream of frames of image data, will now be described in more detail with reference to FIG. 4.

In step 402, the RDO circuitry 304 of the video processor 208 selects a set of encoding options to consider for a region of the current source frame. As discussed above, the set of encoding options can be for a particular source block (e.g. having a particular size in terms of data elements of the frame) and/or can include, for example, particular motion vectors and/or a particular encoding mode (intra, inter, forward, backward, uni-directional, bi-directional, merge, etc. mode) used to derive the reference block for that particular source block.

Then, in step 404, the RDO circuitry 304 of the video processor 208 determines a cost value for the set of encoding options. Further details of processes for determining a cost value for a particular set of encoding options (e.g. as per step 404) are provided below.

Then, in step 406, the RDO circuitry 304 of the video processor 208 determines whether or not all sets of encoding options have been considered for the region.

If there are still sets of encoding options to be considered, then the next set of encoding options is selected at step 408 and the process returns to step 404 to determine a cost value for that next set of encoding options. For example, differently sized source block(s) and/or differently derived reference block(s) may be considered.

If all of the sets of encoding options have been considered then, in step 410, one or more of the sets of encoded options are selected based on the respective cost values for the different sets of encoding options. In this embodiment, the set(s) of encoding options with the lowest cost value(s) are selected.

Next, in step 412, the video processor 208 encodes each of the one or more source blocks for the region in accordance with the selected set of encoding options for that source block. Further details of encoding a source block (e.g. as per step 412) are provided below.

Then, in step 414, the video processor 208 writes out the one or more encoded source block to memory 216.

Figure 4:
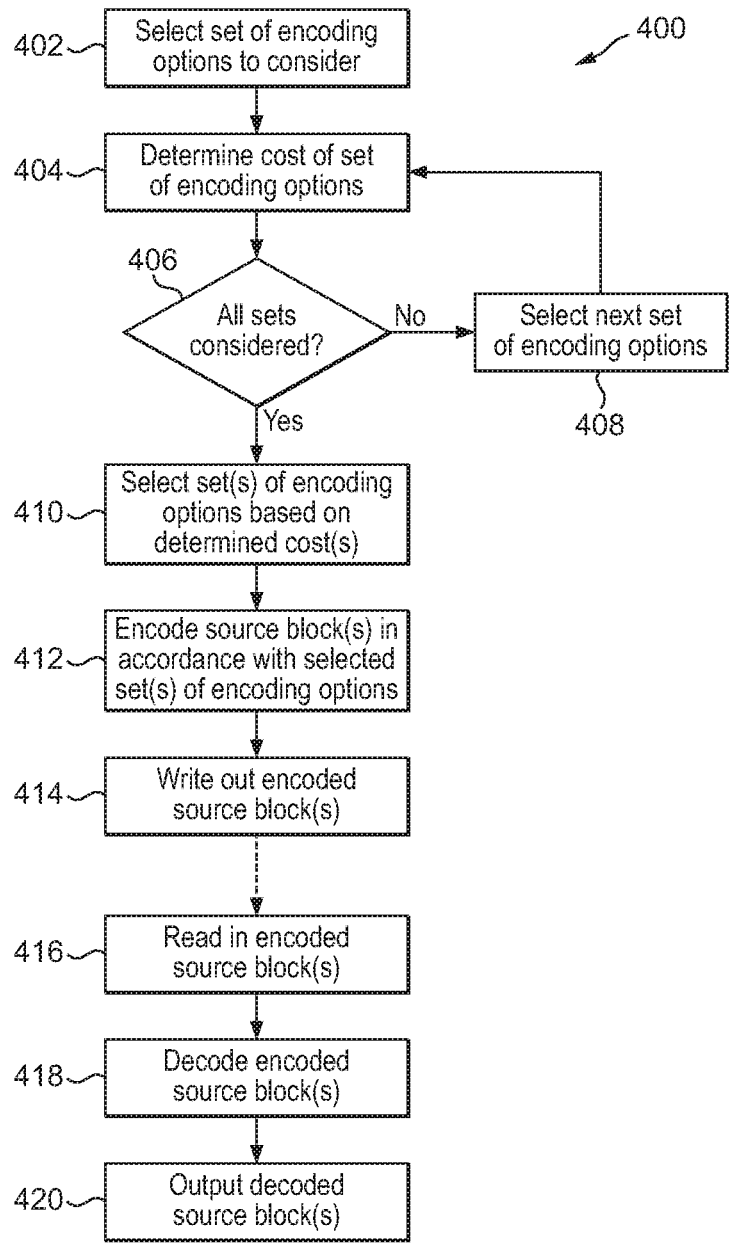
FIG. 4 shows a method of selecting and using a set of encoding options based on a cost value according to embodiments of the technology described herein.

As will be appreciated, the above steps of FIG. 4 would be performed in respect of each region of the source frame and in resect of each frame of the stream of frames so as to generate and store an encoded stream of frames.

At a later time, when it is desired to decode the source block, the video processor 208 can read in the encoded source block from memory 216 in step 416. Then, in step 418, the video processor 208 decodes the encoded source block. Further details of decoding an encoded source block (e.g. as per step 418) are provided below.

Finally, in step 420, the video processor 208 outputs the decoded source block, for example to the display processor 210 for display on the display device 218.

Again, as will be appreciated, the above steps of FIG. 4 would be performed in respect of each encoded source block of each encoded frame so as to generate and output a decoded stream of frames.

Various alternative embodiments to the process of FIG. 4 are also contemplated.

For example, the video processor 208 may select a set of encoding options to consider and may determine a cost value for that set of encoding options. The set of encoding options may be selected for use when encoding the array of data elements if the cost value is below a threshold value. If the cost value is not below the threshold value, then the video processor 208 may repeat the process with a different set of encoding options. This process may continue until a set of encoding options having a suitably low cost value is found or until a termination condition is reached.

For another example, instead of being written out to memory, the encoded stream of arrays may be streamed to another device. That other device may then decode the encoded stream of arrays and output the decoded stream of arrays, e.g. for display.

Processes for determining a cost value for a particular set of encoding options (e.g. as per step 404 of FIG. 4) will now be described in more detail with reference to FIGS. 1, 5A-5C and 6.

As discussed above, FIG. 1 shows a process 100 of determining a cost value for a particular set of encoding options.

As discussed above, the process 100 of FIG. 1 comprises subtracting (−) the data elements of a particular source block (Src) from the data elements of a particular reference block (Pred) to generate a set of difference values. A full forward discrete cosine transformation process (F-DCT) is then applied to the set of difference values to generate a set of frequency domain coefficients. A full quantisation process (Q) is then applied to the set of frequency domain coefficients to generate a set of quantised coefficients. At this point, a bit count process (Bitcount) is applied to the set of quantised coefficients to determine a bit count cost that would be incurred when encoding a region of the array in accordance with the particular set of encoding options under consideration.

A full de-quantisation process (DQ) is then applied to the set of quantised coefficients to generate a set of de-quantised coefficients. An inverse discrete cosine transformation process (I-DCT) is then applied to the set of de-quantised coefficients to generate a set of reconstructed difference values. The set of reconstructed difference values is then added (+) to the reference block to generate a reconstructed source block. At this point, the data elements of the reconstructed source block are then subtracted (−) from the data elements of the original source block to generate a set of error values. A sum-square distortion measuring process (Σ×2) is then applied to the set of error values to determine the amount of distortion that would be introduced when encoding and then decoding a region of the array in accordance with the particular set of encoding options under consideration.

A cost value process (Cost) is then performed to determine an overall cost value for the particular set of encoding options from the bit count value and the distortion value. In this example, the cost value process comprises determining a cost value as a weighted sum of the bit count value and the distortion value.

As discussed above, FIGS. 5A-5C then show intermediate steps by which the process 100 of FIG. 1 is modified so as to arrive at a process of determining a cost value for a particular set of encoding options according to embodiments of the technology described herein.

Figure 5A:
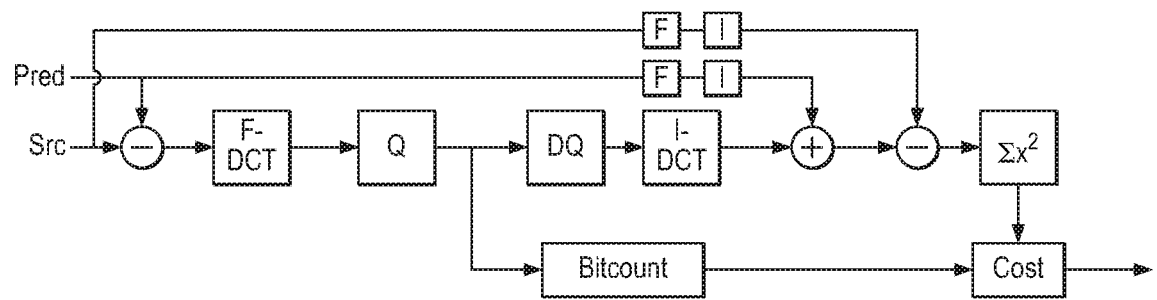
FIGS. 5A-5C show intermediate steps that modify the method of FIG. 1 so as to arrive at a method of determining a cost value according to embodiments of the technology described herein.

As is shown in FIG. 5A, the process 100 of FIG. 1 is firstly modified by applying a forward transformation process (F) and an inverse transformation process (I) to the original source block (Src) prior to subtracting (−) the reconstructed source block from the original source block (Src).

As is also shown in FIG. 5A, the process 100 of FIG. 1 is further modified by applying a forward transformation process (F) and an inverse transformation process (I) to the reference block (Pred) prior to adding (+) the set of reconstructed difference values to the reference block (Pred).

These modifications are made possible because the transformation processes are invertible. As will be appreciated, applying a forward transformation process (F) and then its inverse transformation process (I) is equivalent to applying an identity operation and accordingly has no affect on the source block (Src) or reference block (Pred). The process of FIG. 5A is therefore equivalent to the process 100 of FIG. 1.

Figure 5B:
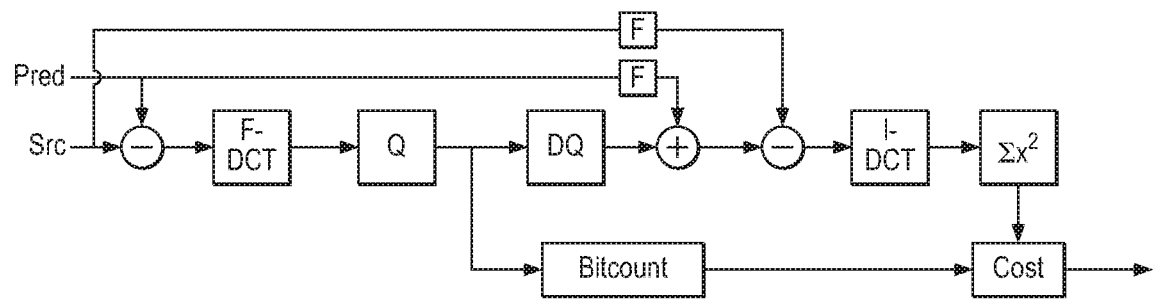

As is shown in FIG. 5B, the process of FIG. 5A is then modified by combining the three inverse transformation processes (1×I-DCT and 2×I) into a single inverse transformation process (I-DCT) that is applied the other side of the addition (+) and subtraction (−) and just prior to performing the sum-square error measuring process (Σ×2). This modification is made possible because the inverse transformation process is linear. The process of FIG. 5B is therefore also equivalent to the process 100 of FIG. 1.

Figure 5C:
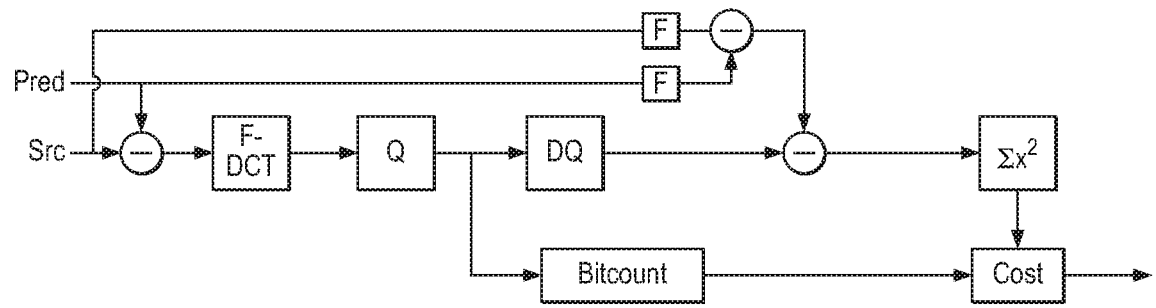

As is shown in FIG. 5C, the process of FIG. 5B is then modified by rearranging the addition (+) and subtraction (−) processes as two subtraction (−) processes that are equivalent to the addition (+) and subtraction (−) processes.

As is also shown in FIG. 5C, the process of FIG. 5B is further modified by removing the inverse transformation process (I-DCT) entirely. This modification results in an approximation of the process 100 of FIG. 1, but this approximation has been found to produce acceptable results. This is because Parseval's Theorem can be applied to the inverse transformation process and the sum square (Σ×2) is substantially invariant under transformation.

As discussed above, FIG. 6 then shows a process 600 of determining a cost value for a particular set of encoding options according to embodiments of the technology described herein.

Figure 6:
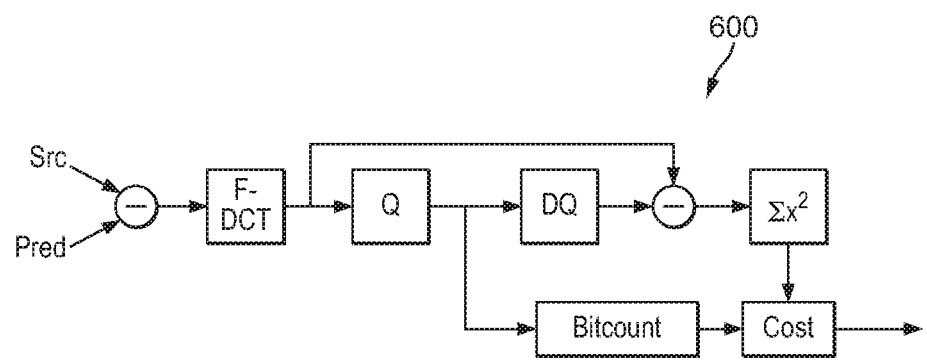
FIG. 6 illustrates a method of determining a cost value for a particular set of encoding options according to embodiments of the technology described herein.

As is shown in FIG. 6, the process of FIG. 5C is finally modified by combining the three forward transformation processes (1×F-DCT and 2×F) into a single forward transformation process (F-DCT) that is applied to the set of difference values just prior to applying the quantisation process (Q). Again, this modification is made possible because of the forward transformation process is linear.

Thus, the process 600 of FIG. 6 comprises subtracting (−) the data elements of a particular source block (Src) from the data elements of a particular reference block (Pred) to generate a set of difference values. A forward discrete cosine transformation process (F-DCT) is then applied to the set of difference values to generate a set of frequency domain coefficients. A quantisation process (Q) is then applied to the set of frequency domain coefficients to generate a set of quantised coefficients. At this point, a bit count process (Bitcount) is applied to the set of quantised coefficients to determine a bit count cost that would be incurred when encoding a region of the array in accordance with the particular set of encoding options under consideration.

A de-quantisation process (DQ) is then applied to the set of quantised coefficients to generate a set of de-quantised coefficients. At this point, the set of de-quantised coefficients are then subtracted (−) from the set of frequency domain coefficients to generate a set of error values. A sum-square distortion measuring process (Σ×2) is then applied to the set of error values to determine the amount of distortion that would be introduced when encoding and then decoding a region of the array in accordance with the particular set of encoding options under consideration.

A cost value process (Cost) is then performed to determine an overall cost value for the particular set of encoding options from the bit count value and the distortion value. In this embodiment, the cost value process comprises determining a cost value as a weighted sum of the bit count value and the distortion value.

Thus, in the process 600 of FIG. 6, the set of error values that is used to determine the distortion value is generated directly from the set of de-quantised coefficients and the set of frequency domain coefficients, rather than being generated from a reconstructed version of a source block and the original source block itself (as is the case in the process 100 shown in FIG. 1). This means that there is no need to perform an inverse transformation process so as to generate a reconstructed source block (which can be expensive in terms of processing resources and power).

The process 600 of FIG. 6 can, therefore, significantly reduce the amount of processing resources and power needed to select encoding options to use when encoding an array of data elements.

In the present embodiment, the process 600 of FIG. 6 is further improved by applying respective forward transformations to all of the rows of the array of difference values, but then applying respective forward transformations to only a subset of the columns of the resultant row-transformed array. This is possible because Parseval's Theorem applies and the distortion value is substantially invariant under the transformation process.

Figure 7A:
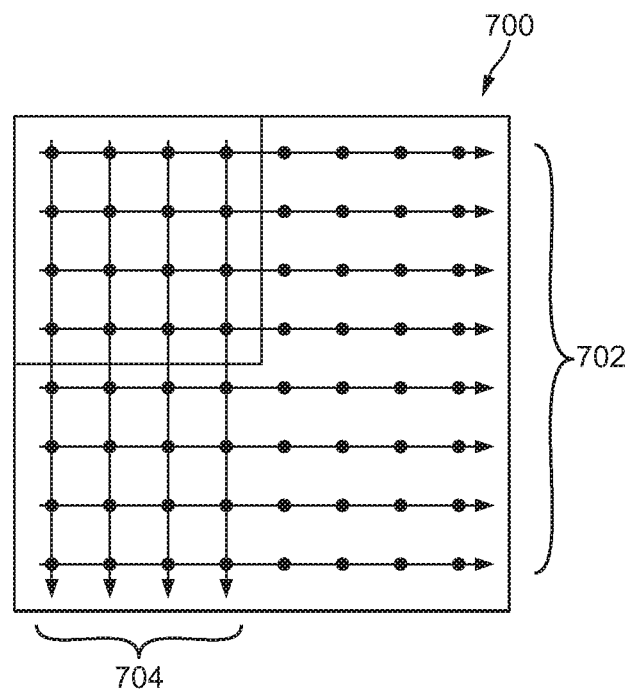
FIG. 7A illustrates a method of applying a forward transformation process according to embodiments of the technology described herein.

For example, FIG. 7A illustrates how forward transformations can be applied to all 8 rows 702 of an array of difference values 700 but then to only 4 of the columns 704 of the resultant row-transformed array. Thus, in this embodiment, only 12 (i.e. ¾) of the full set of 16 forward transformations are applied. This saves around ¼ of the processing required for applying the forward transformations.

As will be appreciated, in other embodiments, respective forward transformations may be applied to different subsets of the columns of the resultant row-transformed array. In yet other embodiments, respective forward transformations may be applied to all of the columns of the array of difference values but then to only a subset of the rows of the resultant column-transformed array.

In the present embodiment, the process 600 of FIG. 6 is also further improved by applying the quantisation process to only a subset of the lower frequency coefficients of the complete array of frequency domain coefficients, with the other coefficients of the array of frequency domain coefficients being set to zero. This is possible because most of the distortion is present in the lower frequency coefficients of the set of frequency domain coefficients.

Figure 7B:
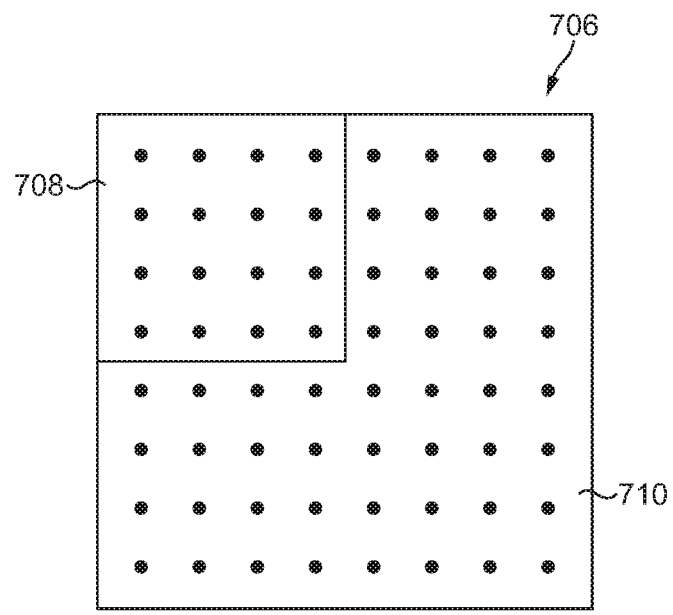
FIG. 7B illustrates a method of applying a quantisation process according to embodiments of the technology described herein.

For example, FIG. 7B indicates a subset of lower frequency coefficients in the top-left quadrant 708 of an array of frequency domain coefficients 706 to which the quantisation process is applied. In this embodiment, the subset of lower frequency coefficients corresponds to the subset of frequency domain coefficients that are fully calculated in FIG. 7A. The coefficients of the other 3 quadrants 710 of the array of frequency domain coefficients 706 are set to zero. Thus, in this embodiment, only 16 (i.e. ¼) of the array of 64 frequency domain coefficients 706 are quantised. This saves around ¾ of the processing required for applying the quantisation process.

As will be appreciated, in other embodiments, the quantisation process may be applied to other subsets of the frequency coefficients of the array of frequency domain coefficients.

In other embodiments, the improvements made to the forward transformation process and/or the improvements made to the quantisation processes described above with reference to FIGS. 7A and/or 7B can be applied to the process 100 of FIG. 1 rather than to the process 600 of FIG. 6.

A process of encoding a source block of a source frame using a selected set of encoding options (e.g. as per step 412 of FIG. 4) will now be described with reference to FIG. 3.

Firstly, a selected reference block that is to be used to encode a selected source block is provided. For example, where the source block is to be encoded in inter mode, MC (motion compensation) circuitry 310 applies a selected motion vector generated by the ME circuitry 308 to a selected reference frame to derive the selected reference block. Similarly, where the source block is to be encoded in intra mode, a selected reference block of the source frame is derived by TRF (transform) circuitry 312.

In either case, the TRF circuitry 312 then subtracts the data elements of the selected source block from the data elements of the selected reference block to generate a set of difference values. The TRF circuitry 312 then applies a full forward discrete cosine transformation process to the set of difference values to generate a set of frequency domain coefficients. The TRF circuitry 312 then applies a full quantisation process to the set of frequency domain coefficients to generate a set of quantised coefficients.

A bitstream encoder/decoder 314 then encodes the coefficients for the source block that are generated by the TRF circuitry 312. The encoding scheme can comprise any suitable entropy (variable length) coding scheme.

As will be appreciated, the above encoding process is then repeated for each selected source block of the source frame using the selected sets of encoding options for the source frame.

The output of the bitstream encoder/decoder 314 is accordingly an encoded bitstream that comprises sets of encoded coefficients. The selected modes and/or motion vectors that were used in the encoding process are also included in the bitstream.

The encoded bitstream can then be output, e.g. to memory 216 or streamed to another device, via the interface 302.

A process of decoding an encoded source block (e.g. as per step 416 of FIG. 4) will also now be described with reference to FIG. 3.

First, an encoded bitstream is provided, e.g. from memory 216 or from another device, via the interface 302.

The bitstream encoder/decoder 314 then decodes the encoded bitstream to generate a set of quantised coefficients for the source block to be reconstructed. The decoding scheme can comprises any suitable decoding scheme that corresponds to the entropy encoding scheme that was used to encode the bitstream.

The TRF circuitry 312 then applies a full dequantisation process to the set of quantised coefficients to generate a set of frequency domain coefficients for the source block to be reconstructed. The TRF circuitry 312 then applies a full inverse discrete cosine transformation process to the set of frequency domain coefficients to generate a set of difference values for the source block to be reconstructed.

A reference block that was used to encode the source block is also provided. For example, where the source block was encoded in inter mode, the relevant reference block is derived from a previously reconstructed reference frame. Similarly, where the source block was encoded in intra mode, the relevant reference block is derived from a previously reconstructed region of the source frame.

In either case, the TRF circuitry 312 then adds the set of difference values to the data elements of the reference block to generate the data elements of the reconstructed source block.

As will be appreciated, the above decoding process is then repeated for each source block of the source frame.

A loop filter 316 is then used to smooth or "de-block" the regions of the reconstructed source frame. The reconstructed source frame can then be output, e.g. for display, via the interface 302.

Other arrangements for the data processing system 200, data processing apparatus 202 and video processor 208 would, of course, be possible.

It should again be noted here that the drawings are only schematic, and that, for example, in practice the shown elements may share significant hardware circuits, even though they are shown schematically as separate elements in the drawings. For example, one or more of the processes (e.g. motion compensation, transformation, quantisation, etc.) that are performed in the RDO process may be performed using the same circuitry as the equivalent steps that are performed in the encoding and/or decoding processes.

It can be seen from the above that embodiments of the technology described herein can provide a more efficient way of selecting encoding options to use when encoding an array of data elements, but without a detrimental reduction in the efficacy of the selection process. For example, in embodiments, the quality degradation was measured to be <0.05 dB.

This is achieved in embodiments of the technology described herein by selecting a set of encoding options based on a bit count value and distortion value for that set of encoding options, wherein the distortion value is determined from a set of error values that represents the difference between a set of frequency domain coefficients and a set of de-quantised coefficients. This is further achieved in embodiments of the technology described herein by generating the set of frequency domain coefficients by applying only a subset of row transformations or only a subset of column transformations. This is further achieved in embodiments of the technology described herein by generating a set of quantised coefficients by quantising only a subset of the set of frequency domain coefficients.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of selecting encoding options to use when encoding an array of data elements of a stream of arrays of data elements, the method comprising:
   in accordance with a particular set of encoding options:
      generating a set of difference values, wherein the set of difference values is a set of values that that represents the difference between a source block of data elements of the array of data elements and a reference block of data elements, and wherein the reference block of data elements is derived from one or more arrays of data elements of the stream of arrays of data elements;

generating a set of frequency domain coefficients for the set of difference values by applying a forward transformation process to the set of difference values;

generating a set of quantized coefficients by applying a quantisation process to the set of frequency domain coefficients;

determining a bit count value for the particular set of encoding options from the set of quantized coefficients;

generating a set of de-quantized coefficients by applying a de-quantisation process to the set of quantized coefficients;

generating a set of error values using the set of de-quantized coefficients, wherein the set of error values is a set of values that represents the difference between the set of frequency domain coefficients and the set of de-quantized coefficients;

determining a distortion value for the particular set of encoding options from the set of error values; and selecting, based on the bit count value and the distortion value, whether to encode the source block in accordance with the particular set of encoding options.

2. The method as claimed in claim 1, wherein the forward transformation process comprises applying only a subset of row transformations or only a subset of column transformations.

3. The method as claimed in claim 2, wherein the number of transformations in the subset of row or column transformations is half the number of rows or columns of the array of difference values.

4. The method as claimed in claim 1, wherein applying the quantisation process comprises quantising only a subset of the set of frequency domain coefficients.

5. The method as claimed in claim 4, wherein the subset of frequency domain coefficients that are quantized comprises a subset of relatively lower frequency coefficients of the set of frequency domain coefficients.

6. The method as claimed in claim 4, wherein the subset of frequency domain coefficients that are quantized is one quarter of the set of frequency domain coefficients.

7. A data processing apparatus for selecting encoding options to use when encoding an array of data elements of a stream of arrays of data elements, the data processing apparatus comprising processing circuitry including:

processing circuitry configured to, in accordance with a particular set of encoding options:

generate a set of difference values, wherein the set of difference values represents the difference between a source block of data elements of the array of data elements and a reference block of data elements, and wherein the reference block of data elements is derived from one or more arrays of data elements of the stream of arrays of data elements;

generate a set of frequency domain coefficients for the set of difference values by applying a forward transformation process to the set of difference values;

generate a set of quantized coefficients by applying a quantisation process to the set of frequency domain coefficients;

determine a bit count value for the particular set of encoding options from the set of quantized coefficients;

generate a set of de-quantized coefficients by applying a de-quantisation process to the set of quantized coefficients;

generate a set of error values using the set of de-quantized coefficients, wherein the set of error values is a set of values that represents the difference between the set of frequency domain coefficients and the set of de-quantized coefficients; and determine a distortion value for the particular set of encoding options from the set of error values; and further processing circuitry configured to:

select, based on the bit count value and the distortion value, whether to encode the source block in accordance with the particular set of encoding options.

8. The apparatus as claimed in claim 7, wherein the forward transformation process comprises applying only a subset of row transformations or only a subset of column transformations.

9. The apparatus as claimed in claim 8, wherein the number of transformations in the subset of row or column transformations is half the number of rows or columns of the array of difference values.

10. The apparatus as claimed in claim 7, wherein the processing circuitry is configured to, when applying the quantisation process, quantise only a subset of the set of frequency domain coefficients.

11. The apparatus as claimed in claim 10, wherein the subset of frequency domain coefficients that are quantized comprises a subset of relatively lower frequency coefficients of the set of frequency domain coefficients.

12. The apparatus as claimed in claim 10, wherein the subset of frequency domain coefficients that are quantized is one quarter of the set of frequency domain coefficients.

13. A non-transitory computer readable storage medium storing computer software code which when executing on a processor of a data processing apparatus performs a method of selecting encoding options to use when encoding an array of data elements of a stream of arrays of data elements, the method comprising:

in accordance with a particular set of encoding options:

generating a set of difference values, wherein the set of difference values is a set of values that represents the difference between a source block of data elements of the array of data elements and a reference block of data elements, and wherein the reference block of data elements is derived from one or more arrays of data elements of the stream of arrays of data elements;

generating a set of frequency domain coefficients for the set of difference values by applying a forward transformation process to the set of difference values;

generating a set of quantized coefficients by applying a quantisation process to the set of frequency domain coefficients;

determining a bit count value for the particular set of encoding options from the set of quantized coefficients;

generating a set of de-quantized coefficients by applying a de-quantisation process to the set of quantized coefficients;

generating a set of error values using the set of de-quantized coefficients, wherein the set of error values is a set of values that represents the difference between the set of frequency domain coefficients and the set of de-quantized coefficients;

determining a distortion value for the particular set of encoding options from the set of error values; and selecting, based on the bit count value and the distortion value, whether to encode the source block in accordance with the particular set of encoding options.

14. The non-transitory storage medium as claimed in claim 13, wherein the forward transformation process comprises applying only a subset of row transformations or only a subset of column transformations.

15. The non-transitory storage medium as claimed in claim 14, wherein the number of transformations in the subset of row or column transformations is half the number of rows or columns of the array of difference values.

16. The non-transitory storage medium as claimed in claim 13, wherein applying the quantisation process comprises quantising only a subset of the set of frequency domain coefficients.

17. The non-transitory storage medium as claimed in claim 16, wherein the subset of frequency domain coefficients that are quantized comprises a subset of relatively lower frequency coefficients of the set of frequency domain coefficients or wherein the subset of frequency domain coefficients that are quantized is one quarter of the set of frequency domain coefficients.

* * * * *